United States Patent
Jain et al.

(10) Patent No.: US 12,373,637 B2
(45) Date of Patent: Jul. 29, 2025

(54) AUTOMATIC JUSTIFICATION ENHANCEMENT WITH MINIMAL CONTENT EDITING

(71) Applicant: Adobe Inc., San Jose, CA (US)

(72) Inventors: Ashish Jain, Delhi (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 89 days.

(21) Appl. No.: 18/215,345

(22) Filed: Jun. 28, 2023

(65) Prior Publication Data

US 2025/0005262 A1    Jan. 2, 2025

(51) Int. Cl.
    *G06F 40/166*      (2020.01)
    *G06F 3/04842*      (2022.01)
    *G06F 40/189*      (2020.01)
    *G06F 40/40*      (2020.01)

(52) U.S. Cl.
    CPC ........ *G06F 40/166* (2020.01); *G06F 3/04842* (2013.01); *G06F 40/189* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 6,948,119 B1 * | 9/2005 | Farmer | G06F 40/103 715/255 |
| 7,191,390 B2 | 3/2007 | Williamson et al. | |
| 7,444,586 B1 * | 10/2008 | Wormley | G06F 40/163 715/256 |
| 7,949,951 B1 * | 5/2011 | Waterfall | G06F 40/103 715/255 |
| 8,234,571 B1 * | 7/2012 | Menninga | G06F 40/103 715/255 |
| 8,306,356 B1 * | 11/2012 | Bever | G06V 30/268 382/292 |
| 9,223,757 B2 | 12/2015 | Williamson et al. | |
| 11,003,839 B1 * | 5/2021 | Hatch | G06F 40/166 |
| 2002/0124023 A1 * | 9/2002 | Wormley | G06F 40/191 715/251 |
| 2003/0055851 A1 * | 3/2003 | Williamson | G06F 40/103 715/251 |

(Continued)

OTHER PUBLICATIONS

W3C, "Visual Presentation Understanding SC 1.4.8", Available at https://www.w3.org/WAI/GL/WCAG20/WD-UNDERSTANDING-WCAG20-20080310/visual-audio-contrast-visual-presentation.html, 2007, pp. 1-5.

*Primary Examiner* — Tuyetlien T Tran
(74) *Attorney, Agent, or Firm* — Kilpatrick Townsend & Stockton LLP

(57) ABSTRACT

A system and methods for text processing include determining a penalty value for a line of a text in a digital document applied with a justification setting. The penalty value indicates a level of typography violation based on the justification setting. The system and methods further include selecting an alternative phrase from multiple alternative phrases for an original phrase in the line based on the penalty value for the line. The system and methods also include modifying the line by using the selected alternative phrase to create a modified text. The modified text can be displayed in a graphical user interface (GUI) to a user.

18 Claims, 10 Drawing Sheets

(56) References Cited

U.S. PATENT DOCUMENTS

| | | | |
|---|---|---|---|
| 2003/0167448 A1* | 9/2003 | Williamson | G06F 40/103 |
| | | | 715/251 |
| 2006/0136818 A1* | 6/2006 | Burago | G06F 40/103 |
| | | | 715/255 |
| 2009/0182550 A1* | 7/2009 | Alonichau | G06F 40/191 |
| | | | 704/8 |
| 2014/0082530 A1* | 3/2014 | De Oliveira | G06F 40/103 |
| | | | 715/762 |
| 2014/0115432 A1* | 4/2014 | Turner | G06F 40/114 |
| | | | 715/251 |
| 2015/0199821 A1* | 7/2015 | Lyubarskiy | G06K 17/00 |
| | | | 382/173 |
| 2018/0189369 A1* | 7/2018 | Baek | G06F 40/197 |
| 2020/0097525 A1* | 3/2020 | Dhanuka | G06F 16/5838 |
| 2021/0124869 A1* | 4/2021 | Agarwal | G06F 40/109 |
| 2021/0383056 A1* | 12/2021 | Jain | G06V 30/414 |
| 2022/0300517 A1* | 9/2022 | Baughman | G06F 16/2246 |
| 2022/0405469 A1* | 12/2022 | Arora | G06F 40/191 |

* cited by examiner

FIG. 7

802 —
Typography is the art and technique of arranging type to make written language legible, readable, and appealing while displayed. The arrangement of type involves selecting typefaces, point sizes, line lengths, line-spacing, letter-spacing, and adjusting the space between pairs of letters.

804 —
Typography is the art and technique of arranging type for making written language legible, readable, as well as attractive when displayed. The arrangement of type includes selection of typefaces, point sizes, line lengths, line-spacing, letter-spacing, as well as altering the distance between sets of letters.

FIG. 8

902 — Adobe Inc. (originally called Adobe Systems Incorporated) is an American multinational computer software company incorporated in Delaware and headquartered in San Jose, California. It has historically specialized in software for the creation and publication of a wide range of content, including graphics, photography, illustration, animation, multimedia/video, motion pictures, and print.

904 — Adobe was founded in December 1982 by John Warnock and Charles Geschke, who established the company after leaving Xerox PARC to develop and sell the PostScript page description language. Adobe later developed animation and multimedia through its acquisition of Macromedia, from which it acquired Adobe Flash; video editing and compositing software with Adobe Premiere, later known as Adobe Premiere Pro; low-code web development with Adobe Muse; and a suite of software for digital marketing management.

906 — Adobe Inc. (originally known as Adobe Systems Incorporated) is an American multinational computer software company incorporated in Delaware and headquartered in San Jose, California. It has a history of specializing in software for the creation and publication of a wide variety of content, including graphics, photography, illustration, animation, multimedia/video, motion pictures, and print.

908 — Adobe was founded in December 1982 by John Warnock and Charles Geschke, who founded the company after leaving Xerox PARC to develop and sell the PostScript page description language. Adobe later expanded into animation and multimedia through its acquisition of Macromedia, from which it acquired Adobe Flash, video editing and compositing software with Adobe Premiere, later called Adobe Premiere Pro; low-code web development with Adobe Muse; and a suite of software to manage digital marketing.

*FIG. 9*

AUTOMATIC JUSTIFICATION ENHANCEMENT WITH MINIMAL CONTENT EDITING

TECHNICAL FIELD

This disclosure relates generally to electronic text processing. More specifically, but not by way of limitation, this disclosure relates to automatic justification enhancement with minimal content editing.

BACKGROUND

Text layout in a digital document production application involves applying justification to the text in a document. Justification gives the text a cleaner and more professional look. It is usually used for formal publications, such as books, newspapers, and magazines. However, justification can cause uneven spacing between words or between characters within words. Justification may also cause multiple hyphenations in a paragraph. Uneven spacing and excessive hyphenation affect the visual appearance of the text, which may in turn affect readability of the document, especially for people with cognitive disabilities, such as dyslexia. Various approaches have been developed to improve spacing and hyphenation in justified text in a document to improve readability and accessibility of the document.

SUMMARY

Certain embodiments involve automatic justification enhancement with minimal content editing. In one example, a text processing system accesses a text in a digital document. The text includes multiple lines applied with a justification setting. The text processing system determines a penalty value for each of the multiple lines. When the penalty value for a line is greater than a threshold value, the text processing system determines the number of characters that can be changed for the line to reduce the penalty value for the line to be equal to or less than the threshold value. The text processing system selects an alternative phrase for an original phrase in the line based on the number of characters that can be changed for the line. The text processing system modifies the line by using the alternative phrase to create a modified text.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 7 depicts an example of a comparison between the original pull quote in FIG. 5 and a modified and approved pull quote after the selected alternative phrases are accepted in FIG. 6, according to certain embodiments of the present disclosure.

FIG. 8 depicts an example of a comparison between an original justified paragraph and a modified justified paragraph, according to certain embodiments of the present disclosure.

FIG. 9 depicts an example of a comparison between two original paragraphs with inconsistent spacing and two corresponding modified paragraphs with improved spacing, according to certain embodiments of the present disclosure.

DETAILED DESCRIPTION

Figure 1:
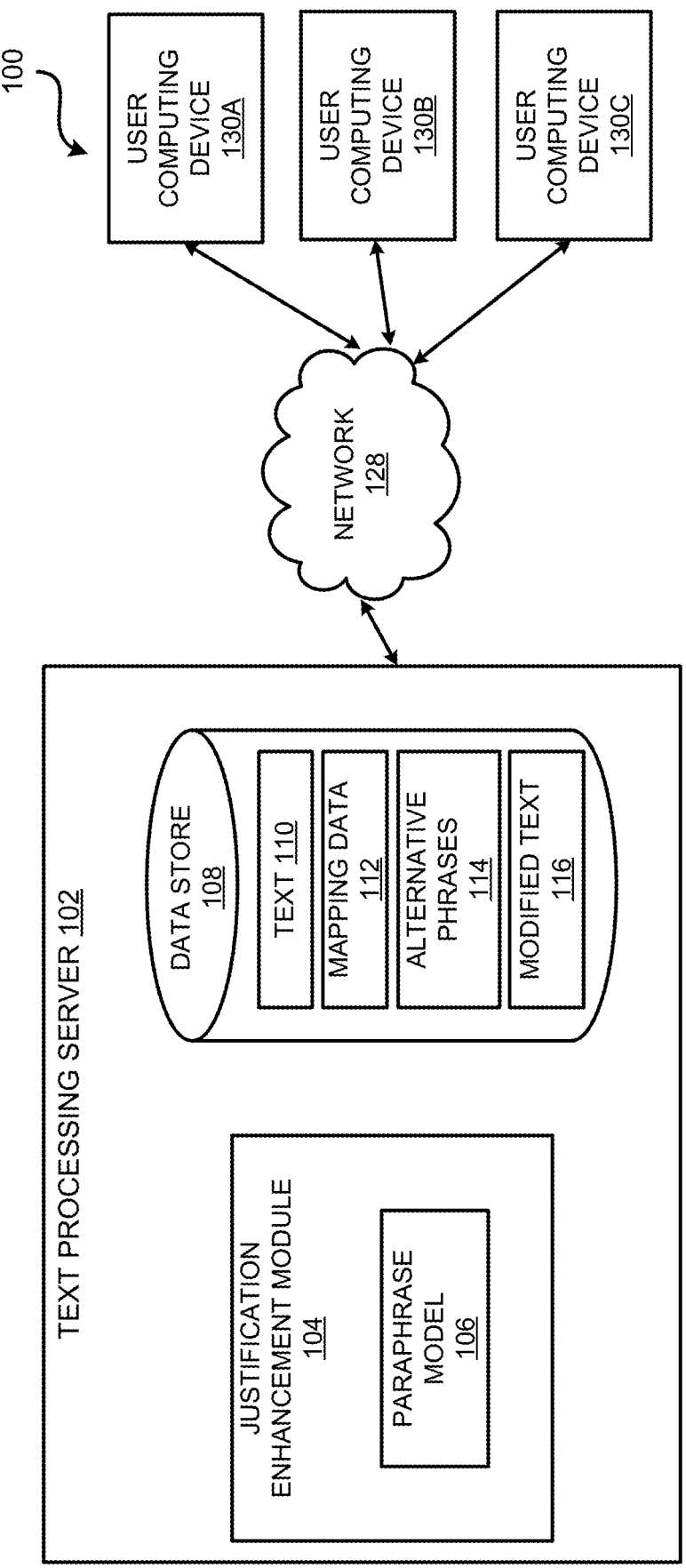
FIG. 1 depicts an example of a computing environment in which a text processing server modified a text to enhance justification, according to certain embodiments of the present disclosure.

The present disclosure provides techniques for automatically enhancing the justification of an electronic text with minimal content editing. Traditionally, to improve spacing and hyphenating in a justified text, one approach is to manually edit certain typographic parameters, such as glyph spacing and glyph scaling. However, changing of these settings may also change the anatomy of the glyph. For example, if some default glyph scaling is changed for the text, it can create noticeable changes in the widths of vertical strokes of the glyph, which can hamper the printability and readability of the text. As a result, users often have to rewrite the content in a manner that results in high quality justification. This approach, however, demands a lot of time and effort from the users, including finding right places where rewording is needed, thinking about how to reword these places, and finalizing the edits to obtain better justification. This becomes increasingly difficult for long documents.

In an embodiment of the present disclosure, a text processing server can automatically improve the justification of a text in a digital document with minimal editing. The text includes multiple lines applied with a justification setting. The text processing server determines a level of uneven spacing and excessive hyphenation caused by the justification setting for each line. When the level of uneven spacing and excessive hyphenation is greater than a threshold value, the text processing server determines the number of characters that can be added to or removed from the line to lower the level of uneven spacing and excessive hyphenation to be less than the threshold value. The text processing server selects an alternative phrase for an original phrase in the line that best matches the determined number of characters and reduces the level of uneven spacing and excessive hyphenation the most. The text processing server modifies the line with the alternative phrase so that the spacing and hyphenation of the line is improved.

In further embodiments, the text processing server iteratively processes the justified text until the appearance of spacing and hyphenation is satisfactory. For instance, if the level of uneven spacing and excess hyphenation for the modified text as discussed above is still greater than the threshold value, the text processing server selects another alternative phrase for another original phrase in the justified text while keeping the alternative phrase used in the modified text unchanged. The modified text can be further modified by the newly selected alternative phrase. This way, the text processing server can modify the justified text with multiple alternative phrases replacing multiple original phrases until the level of uneven spacing and excessive hyphenation is below the threshold value.

In some embodiments, the text processing server determines an overall level of uneven spacing and excessive hyphenation for the justified text. The overall level can be an aggregate value of the levels for individual lines. When the justified text is modified, the overall level of the uneven spacing and excessive hyphenation for the modified text is also determined. Thus, the change of the overall level of uneven spacing and excessive hyphenation can be obtained. The change of the overall level can be displayed with the modified text in a graphical user interface (GUI) to show how much the justification has improved.

The following non-limiting example is provided to introduce certain embodiments. In this example, a text processing server communicates with a user computing device over a network. The text processing server accesses a text in a digital document, for example, through the user computing device. The text can be one or more paragraphs including multiple lines, applied with a justification setting. The justification setting can be justifying the text with the last line left aligned, justifying the text with last line center aligned, justifying the text with last line right aligned, or justifying all lines of the text.

The text processing server determines a penalty value for each line of the text. The penalty value is determined based on multiple constraining factors, for example word spacing, character spacing, glyph scaling, hyphenation, and format consistency. Characters can include individual letters, numerical digits, common punctuation marks, whitespace, or any other symbols that can be recognized by a computer. A word refers to a unit of characters that has a specific meaning in a certain language. The penalty value represents a level of violating the multiple constraining factors. When the penalty value for a line is greater than a threshold value, the text processing server determines the number of characters that can be changed for the line so that the penalty value can be reduced to be equal to or less than the threshold value. The nature of change for the line can be adding the number of characters to or removing the number of characters from the line.

The text processing server generates multiple paraphrases of the line, for example, using natural language processing (NLP) techniques. A paraphrase of a line uses alternative phrases for respective original phrases in the line. An original phrase may include one or more words. Similarly, an alternative phrase may include one or more words. The text processing server can generate multiple alternative phrases for one original phrase. The text processing server selects one or more candidate phrases, which best match the number of characters and the nature of change, from the multiple alternative phrases for replacing the original phrase. The text processing server then narrows the selection to one alternative phrase that reduces the penalty value for the line the most. For example, the text processing server determines that five characters can be removed from a particular line to reduce the penalty value of the line to be equal to or less than the threshold value. Three candidate phrases, which satisfies this requirement, can be selected out of the multiple alternative phrases to modify the line. The three candidate phrases can all make minimal edits needed for the penalty value of the line to be reduced below the threshold value. The text processing server then determines penalty values for three paraphrases of the line containing the three candidate phrases respectively. The text processing server finalizes on one alternative phrase, with which a corresponding paraphrase of the line has the lowest penalty value out of the three paraphrases of the line, to modify the line. The text processing server modifies the text with the selected alternative phrase. The modified text can be displayed on a graphical user interface (GUI) via the user computing device.

The text processing server can further determine an original overall penalty for the text based on penalty values for the lines in the text, and similarly, determines an updated overall penalty for the modified text based on updated penalty values for the lines of the modified text. A penalty reduction score is obtained by comparing the updated overall penalty to the original overall penalty. The penalty reduction score can be displayed on the GUI with the modified text. The GUI can also display both the original phrase and the alternative phrase selected by the text processing server. A user can accept or reject the selected alternative phrase via the GUI on the user computing device.

The text processing server can run the process described above multiple times, and each time is referred to as a run of the process. When the selected alternative phrase is accepted by a user in the current run, the text processing system records the accepted alternative phrase. When the text processing server processes the modified text again in a next run, the text processing system can exclude the accepted alternative phrase in the current run from being modified in the next run. Similarly, when the selected alternative phrase is rejected by the user in the current run, the text processing system also records the rejected alternative phrase. When the text processing server processes the modified text again in the next run, the text processing system can exclude the rejected alternative phrase in the current run from being selected in the next run.

Certain embodiments of the present disclosure overcome the disadvantages of the prior art, by automatically enhancing justification of electronic text with minimal content editing. The proposed process automatically identifies certain lines in a text that need rewording or paraphrasing based on line-penalty values. NLP techniques are implemented to automatically suggest alternative phrases for certain phrases in the text. An alternative phrase is selected that leads to minimal editing to the line and the largest penalty value reduction for the line. Thus, a user does not need to read through the text to identify lines with uneven spacing and try to paraphrase or edit these lines, which is time-consuming. In addition, the proposed process enables the user to accept or reject the selected alternative phrases based on their preference. Moreover, the proposed process records the accepted or rejected alternative phrases, so that the accepted alternative phrases may not be edited, and the rejected alternative phrases may not show up when reprocessing the text, which also saves editing time for the user. Overall, the proposed process improves the readability of a text by automatically enhancing justification of the text with minimal content editing, and it reduces time for editing the text.

Referring now to the drawings, FIG. 1 depicts an example of a computing environment 100 in which a text processing server 102 modifies a text to enhance justification, according to certain embodiments of the present disclosure. In various embodiments, the computing environment 100 includes a text processing server 102 connected with user computing devices 130A, 130B, and 130C (which may be referred to herein individually as a user computing device 130 or collectively as the user computing devices 130) via a network 128. The network 128 may be a local-area network ("LAN"), a wide-area network ("WAN"), the Internet, or any other networking topology known in the art that connects the user computing device 130 to the text processing server 102.

The user computing device 130 is configured to transmit a request for enhancing justification of a text 110 in a digital document. The text 110 can be one or more paragraphs including multiple lines, applied with a justification setting. The justification setting can be justifying the text with the last line left aligned, justifying the text with last line center aligned, justifying the text with last line right aligned, or justifying all lines of the text. With the justification setting applied, the text may have uneven spacing or excessive hyphenation.

The text processing server 102 includes a justification enhancement module 104 and a data store 108. The justification enhancement module 104 is configured to determine a penalty value for each line of the text. A penalty value represents a level of violating certain constraining factors. A penalty value may take several factors into account, for example, character size, word spacing, character spacing, glyph scaling (e.g., width of characters), change in word or character format, hyphenation, and line or paragraph consistency. The justification enhancement module 104 can implement a penalty function to determine the penalty value for each line of the text. In the penalty function, a violation measure of each constraining factor is weighted by a penalty parameter. The penalty parameters for the constraining factors may be different based on the effect of the constraining factors to the appearance or readability of the text.

The justification enhancement module 104 is also configured to compare the penalty value of each line to a threshold value. If the penalty value for a line is greater the threshold value, the justification enhancement module 104 determines the number of characters that can be changed for the line so that the penalty value for the line can be reduced to be smaller than the penalty value. The nature of the change indicates whether to add the number of characters to or remove the number of characters from the line. Several lines in the text 110 can have a penalty value greater than the threshold value. The justification enhancement module 104 can determine the number of characters that can be changed for each of the several lines so that the penalty value for each of the several lines becomes equal to or less than the threshold value. The justification enhancement module 104 is configured to map the penalty values for lines that are greater than the threshold value and corresponding numbers of characters with the nature of change to these lines to reduce the corresponding penalty values to be equal to or less than the penalty value. Therefore, the justification enhancement module 104 can generate mapping data 112 including identifiers of the lines that have penalty values greater than the threshold value, corresponding penalty values, and corresponding numbers of characters with the nature of change to the corresponding lines.

The justification enhancement module 104 is also configured to find multiple alternative phrases 114 that can replace an original phrase in the line. In some examples, the justification enhancement module 104 includes a paraphrase model 106 for generating alternative phrases. The paraphrase model 106 can implement NLP techniques, for example a Text-To-Text Transfer Transformer (T5) algorithm, to identify the original phrases in each line that can be edited and find the alternative phrases for the original phrases.

The justification enhancement module 104 is configured to select one alternative phrase from the multiple alternative phrases that best matches the number of characters with the corresponding nature of change. In turn, the selected alternative phrase makes minimal editing to each line of the text 110 or the entire text 110 and reduces the penalty value the most for each line of the text 110 or the entire text 110. The justification enhancement module 104 modifies the line with the selected alternative phrase to create modified text 116. The modified text 116 can be displayed via a GUI on a user computing device 130. In some examples, the GUI displays both the original phrase and the selected alternative phrase. The GUI enables a user to accept or reject the selected alternative phrase.

The data store 108 is configured to store data processed or generated by the text processing server 102. Examples of the data stored in the data store 108 include the text 110, the mapping data 112, the alternative phrases 114, and the modified text 116. The text 110 is the original text applied with a justification setting as input to the text processing server 102. The mapping data 112 includes identifiers for the lines that have penalty values greater than the threshold value, corresponding penalty values, and corresponding numbers of characters with the nature of change to corresponding lines. The alternative phrases 114 are phrases that are found by the text processing server 102 and can replace certain original phrases in the lines having greater penalty values than the threshold values. The modified text 116 include selected alternative phrases replacing certain original phrases which may or may not be included in the modified text.

Figure 2:
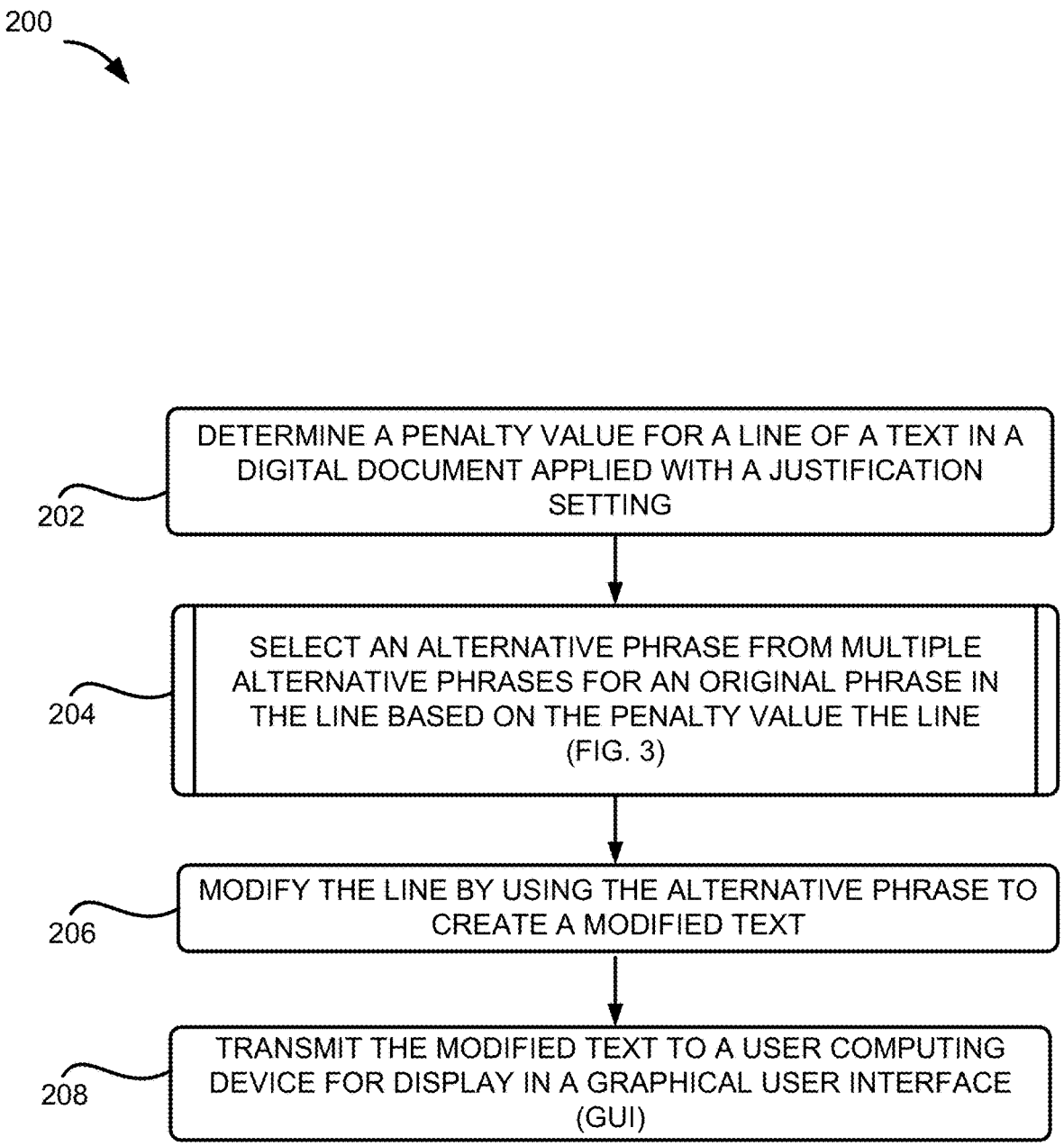
FIG. 2 depicts an example of a process for automatically enhancing justification of a text, according to certain embodiments of the present disclosure.

FIG. 2 depicts an example of a process 200 for automatically enhancing justification of a text, according to certain embodiments of the present disclosure. At block 202, a text processing server 102 determines a penalty value for a line of a text in a digital document applied with a justification setting. The digital document can be stored on a user computing device 130 or on the cloud but accessible via the user computing device 130. The user computing device 130 can give permission to the text processing server 102 for processing the text 110. The text 110 in the digital document can include one or more paragraphs. The text 110 can be part of or the entire digital document. The text 110 can be justified with last line left aligned, with last line right aligned, with last line center aligned. Alternatively, the text 110 can be fully justified, including the last line. The text processing server 102 can take the text 110 as input for processing and optimize or enhance the justification of the text.

A penalty value indicates a level of typography violation (e.g., justification constraint violation) based on the justification setting. In some examples, a penalty value represents a level of violating certain constraining factors. A penalty value may take several constraining factors into account, for example, character size, word spacing, character spacing, glyph scaling (e.g., width of characters), change in word or character format, hyphenation, and line or paragraph consistency. Hyphenation may affect a penalty value in different ways. For example, excessive hyphenation within a paragraph may increase a penalty value of each line with hyphenation. As another example, a penalty value may take into account the location of a particular hyphenation within an individual word. The less desirable the location of the hyphenation is within the word, the higher the penalty value is. Yet as another example, hyphenating particular words, such as the last word on a page, may increase the penalty value. In addition, paragraph consistency may affect a penalty value. For example, the penalty value for a line with narrow word spacing is increased if it immediately follows a line with a wide word spacing. The text processing server can determine an original overall penalty for the text by aggregating the penalty value for each line in the text. The text processing server 102 can implement a penalty function to determine the penalty value for each line of the text. In the penalty function, a violation measure of each constraining factor is weighted by a penalty parameter. The penalty parameters may vary for different constraining factors based on the effect of each constraining factor on the appearance or readability of the text. The violation measure is nonzero when the constraining factor is violated and is zero in the region where the constraining factor is not violated.

Figure 3:
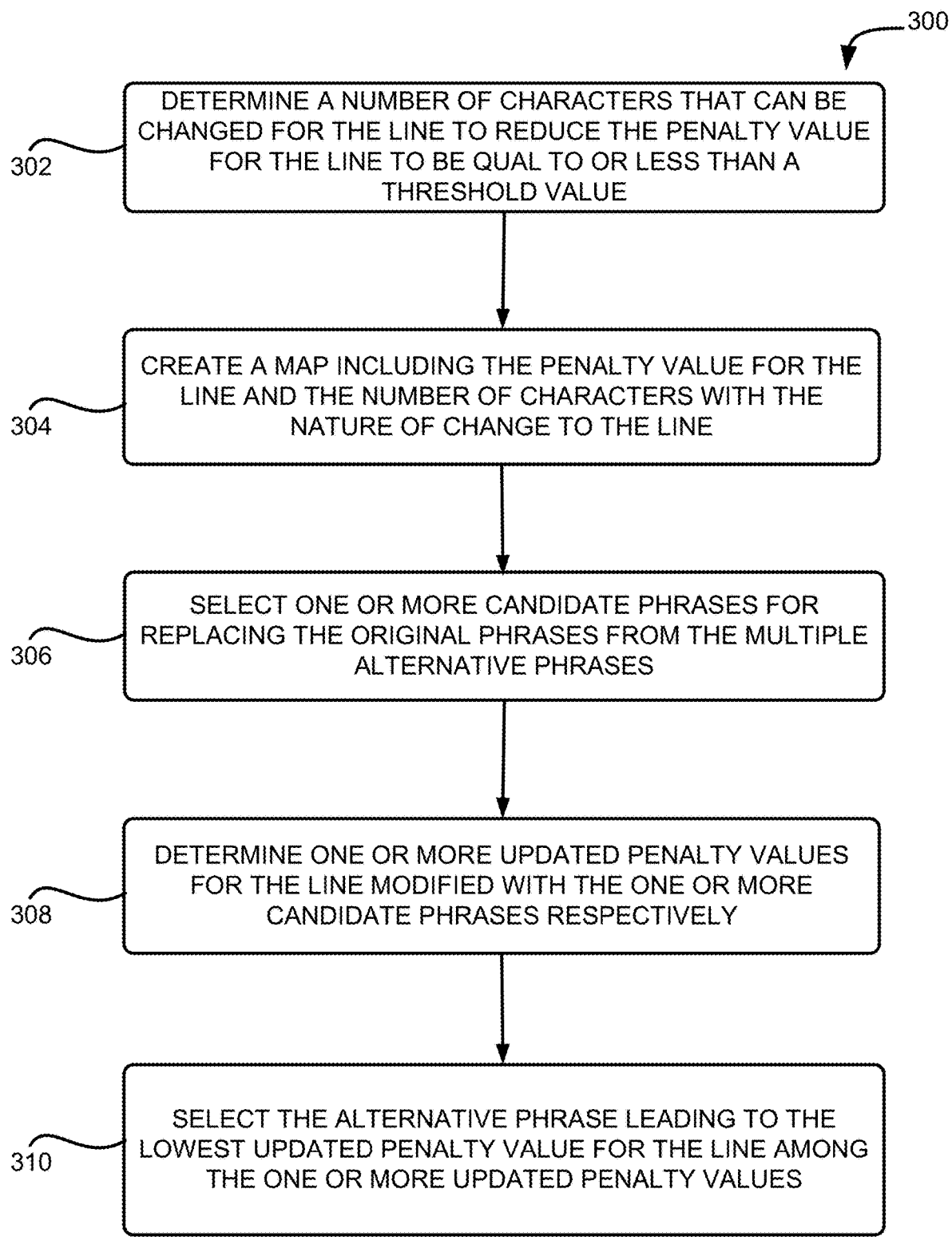
FIG. 3 depicts an example of a process for selecting an alternative phrase for replacing an original phrase in the line, according to certain embodiments of the present disclosure.

At block 204, the text processing server 102 selects an alternative phrase from multiple alternative phrases for an original phrase in the line based on the penalty value for the line. The text processing server 102 can implement NLP techniques (e.g., a T5 algorithm) to analyze the text to identify an original phrase in the line and find multiple alternative phrases 114 for replacing the original phrase. Even though the text processing server 102 determines the penalty values line by line for the text 110, the alternative phrases 114 for an original phase in a line is generated in the context of the text 110 which is the input of the text processing server 102. Among the multiple alternative phrases, the text processing server 102 selects one alternative phrase that best matches the number of characters and the nature of change to the line and reduces the penalty value the most. Details about selecting the alternative phrase for replacing an original phrase in the line are illustrated in FIG. 3.

At block 206, the text processing server 102 modifies the line by using the alternative phrase to create a modified text 116. In some examples, the modified text 116 is a clean text that includes the selected alternative phrase without the original phrase. In some examples, the modified text 116 is a redlined text that includes both the selected alternative phrase and the original phrase. In addition, the text processing server 102 can determine updated penalty values for the lines in the modified text and aggregate the updated penalty values to obtain an updated overall penalty for the modified text 116. The text processing server 102 compares the updated overall penalty to the original overall penalty obtained at block 204 to determine a penalty reduction score. The penalty reduction score represents how much the alternative phrase has reduced the penalty value of the line, in turn the overall penalty of the text. In some examples, the penalty reduction score is a percentage in reference to the original overall penalty.

At block 208, the text processing server 102 transmits the modified text 116 to the user computing device 130 for display in a GUI. In some examples, the modified text 116 is displayed as a clean text including the alternative phrase without the original phrase that the alternative phrase replaced. Alternatively, or additionally, the modified text 116 is displayed in a review setting including both the selected alternative phrase and the original phrase. The GUI includes control elements, such as a context menu including one or more operation options, that enable the user to accept or reject the selected alternative phrase. In addition, the GUI also display the penalty reduction score with the modified text.

The process described from block 202 to block 208 can be repeated multiple times. Each time, the text processing server 102 records the accepted alternative phrase so that the text processing server 102 does not modify the accepted alternative phrase next time. Similarly, the text processing server 102 records the rejected alternative phrase so that the text processing server 102 does not select the rejected alternative phrase next time. However, there can be settings about accepted and rejected alternative phrases on the text processing server 102 accessible via the GUI, so that the user can change the settings to allow or disallow previously accepted or rejected alternative phrases to show up again when reprocessing the same text.

FIG. 3 depicts an example of a process 300 for selecting an alternative phrase for replacing an original phrase in the line, according to certain embodiments of the present disclosure. At block 302, the text processing server 102 determines a number of characters that can be changed for the line to reduce the penalty value for the line to be equal to or less than a threshold value. The text processing server 102 can compare the penalty value for each line to the threshold value to determine the penalty value for a line is greater than the threshold value. Ideally, the threshold value is 0, which means no penalty for the line. In other words, each line has even spacing, the spacing in all the lines of the text is consistent, there is no hyphenation or any other inconsistency in the appearance of the text. However, the ideal scenario is rare in reality. The threshold value represents a benchmark value for the penalty value that can be accepted with regard to the appearance of the text. For example, the threshold value is 2, when the penalty value is on a scale from 0 to 10. If the penalty value for a line is greater than the threshold value, the text processing server 102 determines the number of characters that can be changed for the line to reduce the penalty value for the line to be equal to or less than the threshold value. The number of characters that can be changed for the line is a positive integer N. The nature of the change to the line can be adding the number of characters to or removing the number of characters from the line.

At block 304, the text processing server 102 creates a map including the penalty value for the line and the number of characters with the nature of change to the line. The text processing server 102 may identify several lines whose penalty values are greater than the threshold value. The text processing server 102 determines the number of characters that can be changed for each of the several lines to reduce the penalty value for each of the several lines to be equal to or less than the threshold value. The text processing server 102 stores the penalty values that are greater than the threshold value and the numbers of characters (e.g., positive integers N1, N2, N3 . . . ) with the nature of change to the corresponding lines in the map, which can be collectively referred to as mapping data 112.

At block 306, the text processing server 102 selects one or more candidate phrases for replacing the original phrase in the line from the multiple alternative phrases. Each of the one or more candidate phrases changes the line by X characters with the nature of change determined at block 302. The number X is closer to the number of characters determined at block 302, which can be referred to as number N, than the number Y which is the number of characters that a noncandidate phrase in the multiple alternative phrases causes the line to change. That is, the number X is the closest to the number N. In other words, the one or more candidate phrases best match the number of characters and the nature of change determined for the line at block 302, and would make the minimal edits to the line. For example, the text processing server 102 determines that four characters can be removed from the line to reduce the penalty value of the line to be less than the threshold value. The text processing server 102 finds five alternative phrases for an original phrase in the line. Three alternative phrases A, B, and C, among the five alternative phrases, can reduce the line by four characters, so the three alternative phrases A, B, and C are candidate phrases selected out of the five alternative phrases to modify the line with minimal edits.

At block 308, the text processing server 102 determines one or more updated penalty values for the line to be modified with the one or more candidate phrases respectively. Each candidate phrase can create a paraphrase of the line by replacing the original phrase. Following the example above, the three candidate phrases can create three paraphrases of the line. The text processing server 102 can determine three penalty values for the respective three paraphrases of the line.

At block 310, the text processing server 102 selects the alternative phrase leading to the lowest penalty value among the one or more update penalty values. Continuing the example above, the three paraphrases of the line may have different penalty values. If the paraphrase of the line including candidate phrase A has the lowest penalty value among the three paraphrases, candidate phrase A can be selected as the alternative phrase to modify the line. The case where more than one paraphrase of the line has the same lowest penalty value may be rare, since the penalty function may consider various constraining factors and the penalty parameters may be estimates of importance/weights of corresponding constraining factors. In the event that more than one candidate phrase leads to the same lowest penalty value, the text processing server 102 may present the more than one candidate phrase via the GUI to the user for final selection.

Figure 4:
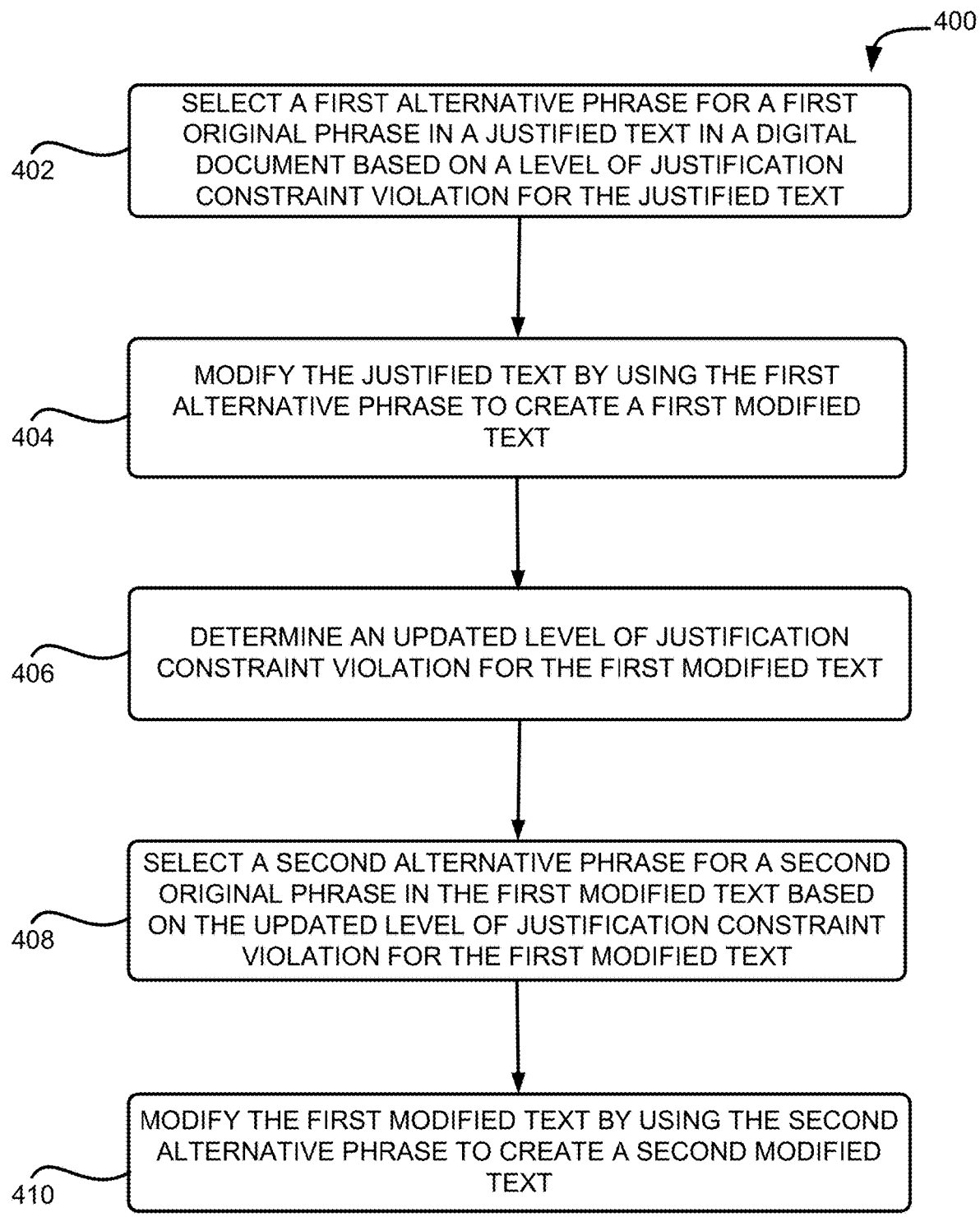
FIG. 4 depicts another example of a process for automatically enhancing justification of a text, according to certain embodiments of the present disclosure.

FIG. 4 depicts another example of a process 400 for automatically enhancing justification of a text, according to certain embodiments of the present disclosure. At block 402, a text processing server 102 selects a first alternative phrase for a first original phrase in a justified text in a digital document based on a level of justification constraint violation for the justified text. The level of justification constraint violation represents a level of violating multiple constraining factors. The multiple constraining factors include word spacing, character spacing, glyph scaling, hyphenation, and format consistency. The level of justification constraint violation for the justified text can be an overall penalty value for the justified text for violating some or all of the multiple constraining factors. In some examples, the justified text in the digital document includes multiple lines. The level of justification constraint violation for the justified text is determined by aggregating penalty values for the multiple lines. The first alternative phrase for the first original phrase can be selected, as described in FIG. 3. For example, the first original phrase is from a line whose penalty value is greater than a threshold value. The text processing server 102 determines a number of characters that can be changed for the line and a nature of change to reduce the penalty value for the line to be equal to or less than the threshold value. The text processing server 102 then selects one or more candidate phrases for replacing the first original phrase from a first set of alternative phrases for the original phrase. The first set of alternative phrases can be determined using a T5 algorithm. The one or more candidate phrases change the total number of characters in the line by X with the determined nature of change, which is closer to the determined number of characters than how many characters noncandidate phrases cause the line to change. Each candidate phrase can modify the line to have a different penalty value. The candidate phrase that modifies the line to have a lowest penalty value is selected to replace the first original phrase.

At block 404, the text processing server 102 modifies the justified text by using the first alternative phrase to create a first modified text. In some examples, the first modified text is a clean text that includes the selected alternative phrase without the original phrase. In some examples, the first modified text is a redlined text that includes both the first alternative phrase and the original phrase to provide an option for the user to accept or reject the selected first alternative phrase.

At block 406, the text processing server 102 determines an updated level of justification constraint violation for the first modified text. The line where the first original phrase was located is modified with the first alternative phrase, and the penalty value for the modified line is updated. The modification of one line may change the spacing or hyphenation of other lines, and in turn, update the penalty values of the other lines. The updated level of justification constraint violation for the first modified text can be an aggregation of updated penalty values for the lines in the first justified text.

At block 408, the text processing server 102 selects a second alternative phrase for a second original phrase in the first modified text based on the updated level of justification constraint violation for the first modified text. The second original phrase is identified by keeping the first alternative phrase in the first modified text unchanged. In this example, block 408 is a repeated operation at block 402 in order to further enhance the justification of the justified text. The second alternative phrase for the second original phrase can be selected, similar to the process how the first alternative phrase for the first original phrase is selected, which is described at block 402.

At block 410, the text processing server 102 modifies the first modified text by using the second alternative phrase to create a second modified text. This is a repeated operation at block 404 to modify the justified text with the second alternative phrase. It can be appreciated that the process 400 illustrates a repeated operation on the justified text for justification optimization. The operations of selecting alternative phrases to modify the justified text can be repeated multiple times until the user is satisfied with the appearance of the justified text.

Figure 5:
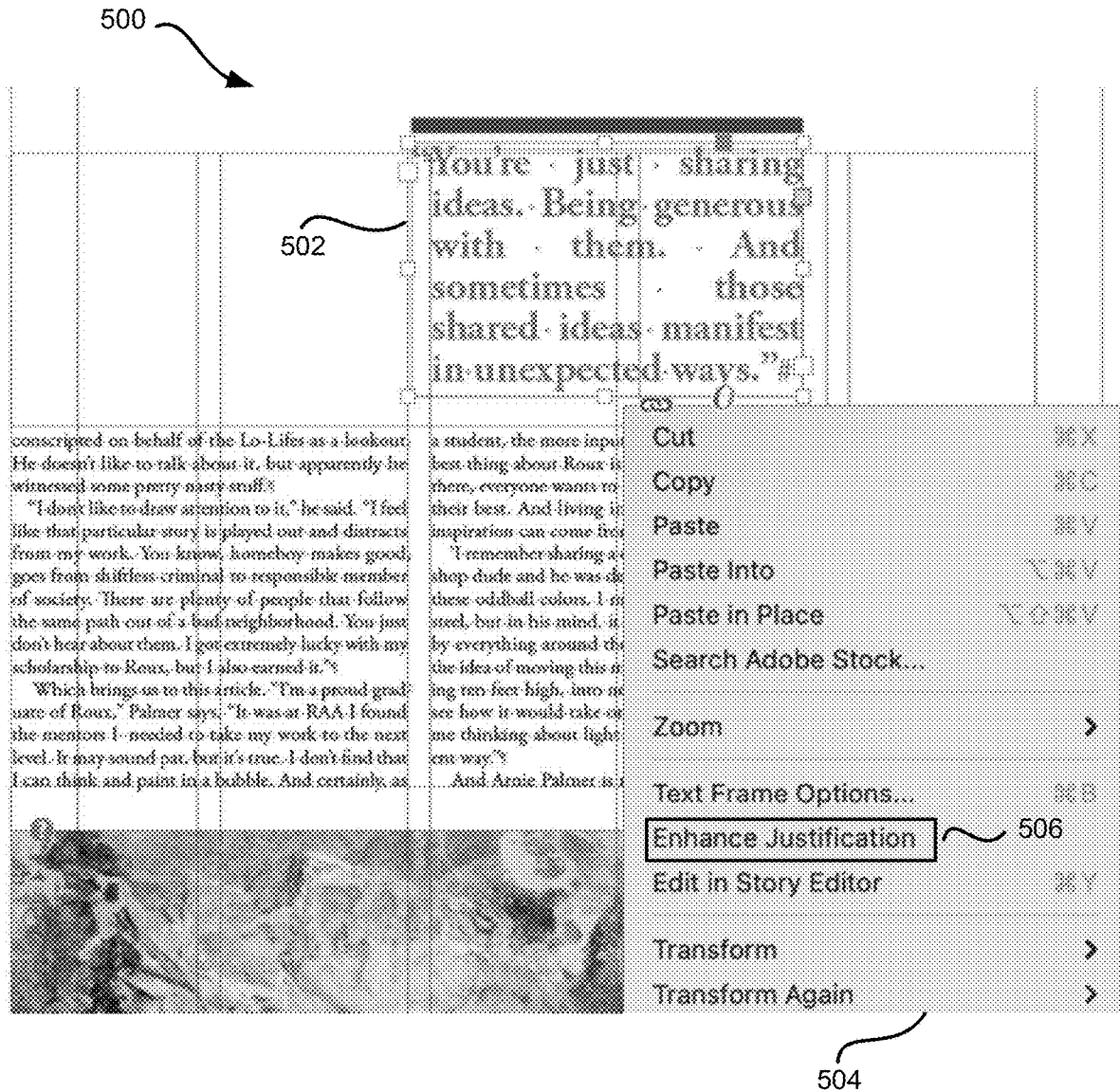
FIG. 5 depicts an example of an original justified text with uneven spacing, according to certain embodiments of the present disclosure.

FIG. 5 depicts an example of an original justified text 500 with uneven spacing before the justification enhancement according to certain embodiments of the present disclosure. The original justified text can be displayed in a GUI on a user computing device 130. In this example, the original justified text 500 is a part of a magazine article with last line aligned to the left. The text processing server 102 can access the original justified text 500 via the user computing device 130. For example, when a user selects a section of the original justified text 500, for example the original pull quote 502, and activates a context menu 504 in the GUI via the user computing device 130 (e.g., by right clicking the mouse), multiple text processing operations provided by the text processing server 102 are displayed on the context menu 504. One of the operations is "Enhance Justification" 506. When the user activates "Enhance Justification" 506, for example by clicking, a request message is transmitted to the text processing server 102 for enhancing the justification of the original pull quote 502. The text processing server 102 then processes the original pull quote 502, as described in FIGS. 2-4.

Figure 6:
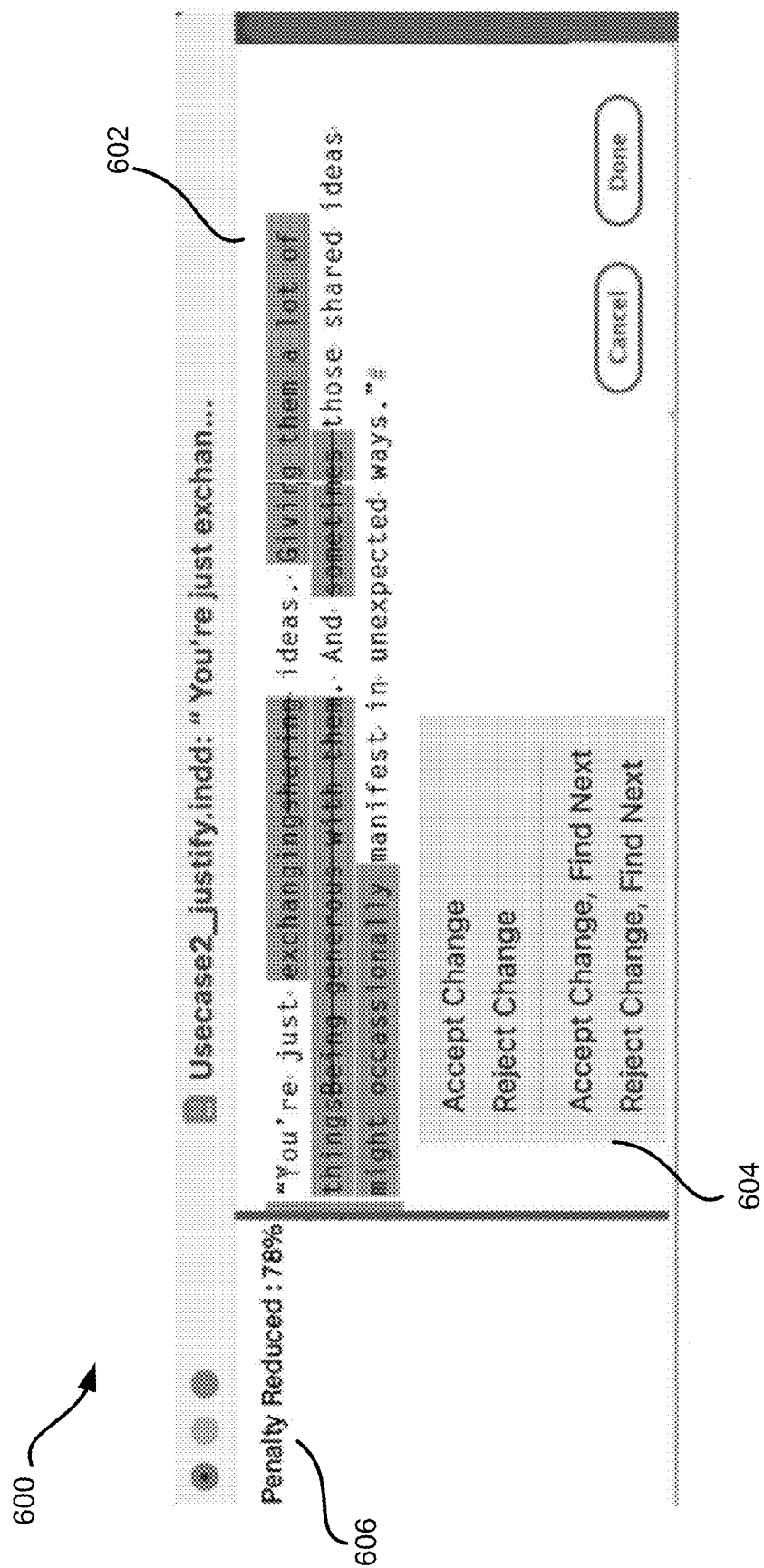
FIG. 6 depicts an example of a graphical user interface displaying a modified pull quote including both selected alternative phrases and corresponding original phrases for the original pull quote in FIG. 5, according to certain embodiments of the present disclosure.

FIG. 6 depicts an example of a GUI 600 displaying a modified pull quote 602 including both selected alternative phrases and corresponding original phrases for the original pull quote 502 in FIG. 5, according to certain embodiments of the present disclosure. The modified pull quote 602 is a redlined text for the original pull quote 502. In this example, the selected alternative phrases and corresponding original phrases are highlighted with the original phrases being stricken through. A user can accept or reject the selected alternative phrases or stricken-through original phrases. In this example, a user can right click a mouse on an alternative phrase or stricken-through original phrase, and select to "Accept Change" or "Reject Change" in a context menu 604. The GUI 600 also includes a penalty reduction score 606, which can be achieved by using the selected alternative phrases shown in the modified pull quote 602. In this example, the penalty reduction score 606 is 78%. That is, the overall penalty for the pull quote 502 can be reduced by 78% when all the selected alternative phrases are accepted in the modified pull quote 602. Once the user completes accepting or rejecting the selected alternative phrases, a modified and approved pull quote can be displayed to the user via the GUI.

Figure 7:
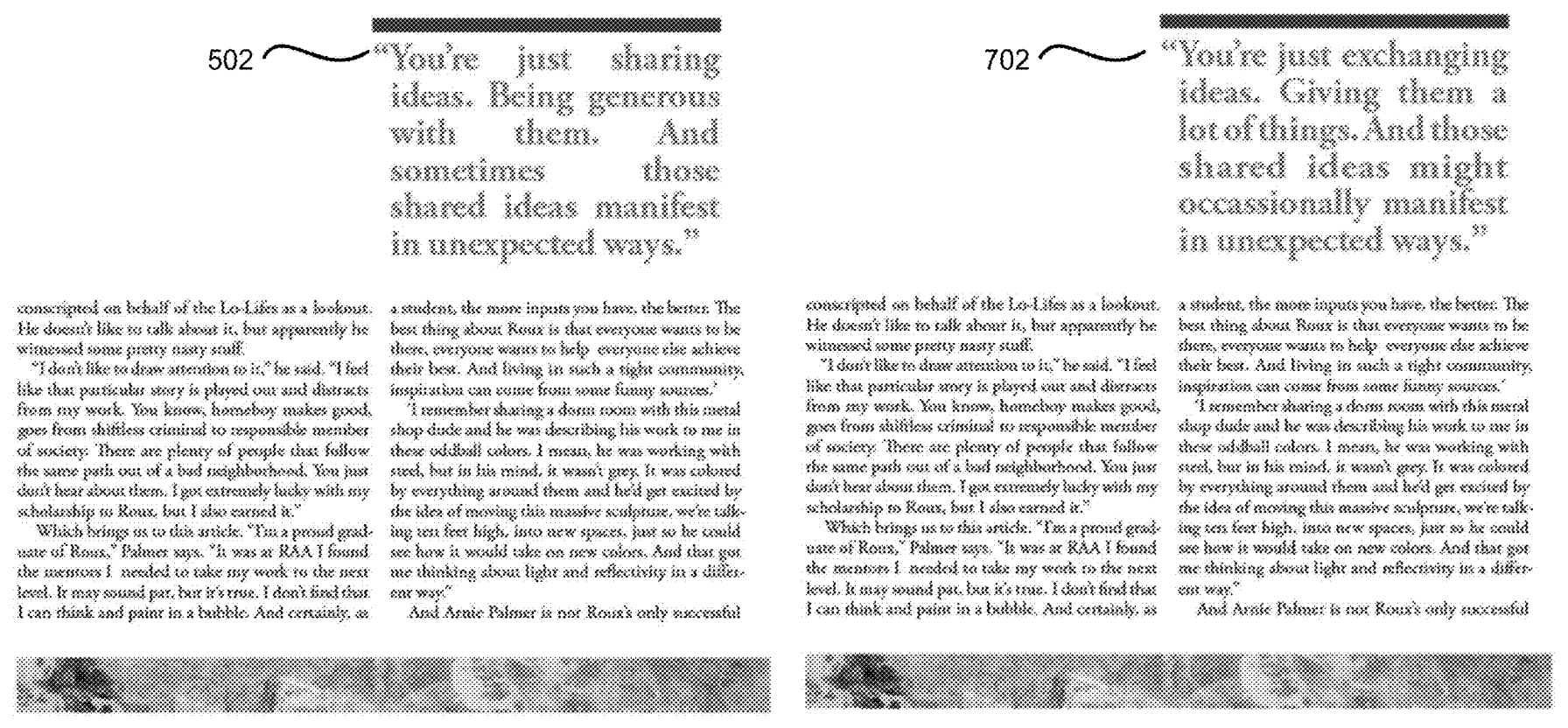

FIG. 7 depicts an example of a comparison between the original pull quote 502 in FIG. 5 and a modified and approved pull quote 702 after the selected alternative phrases are accepted in FIG. 6, according to certain embodiments of the present disclosure. When the user approves all the suggested changes, including adding the selected alternative phrases and deleting the stricken-through original phrases in FIG. 6, the modified and approved pull quote 702 is generated. In FIG. 7, the modified and approved pull quote 702 is displayed in the context of the rest of the original justified text, in juxtaposition with the original pull quote 502 in the context of the rest of the original justified text. The modified and approved pull quote 702 has much more even spacing and gives the entire text a more professional appearance, compared to the original pull quote 502.

FIG. 8 depicts an example of a comparison between an original justified paragraph 802 and a modified justified paragraph 804, according to certain embodiments of the present disclosure. The original justified paragraph 802 has uneven spacing and 3 out of 8 lines (not including last line) are ended with hyphenation. The uneven spacing and excessive hyphenation affect the readability of the original justified paragraph 802. The text processing server 102 can process the original justified paragraph 802 as described in FIGS. 2-4, to generate modified justified paragraph 804. For example, the text processing server can suggest changing "to make" in the original justified paragraph 802 to "for making," changing "and appealing" in the original justified paragraph 802 to "as well as attractive," changing "while" in the original justified paragraph 802 to "when," changing "selecting" in the original justified paragraph 802 to "selection of," changing "adjusting" in the original justified paragraph 802 to "altering." When all the changes are accepted, two hyphenations for "appealing" and "adjusting" are eliminated in the modified justified paragraph 804. Moreover, the spacing in the modified justified paragraph 804 is more even than that in the original justified paragraph 802, as illustrated by highlighted spaces in FIG. 8.

Compared to the original justified paragraph 802, the modified justified paragraph 804 has more even spacing between words and only one line ended with hyphenation. The net penalty reduced is 69% for the modified justified paragraph 804. That is, the overall penalty for the modified justified paragraph 804 is 69% less compared to the overall penalty of the original justified paragraph 802.

FIG. 9 depicts an example of a comparison between two original paragraphs 902 and 904 with inconsistent spacing and two corresponding modified paragraphs 906 and 908 with improved spacing, according to certain embodiments of the present disclosure. The original paragraph 902 is justified with loose spacing between words and original paragraph 904 is justified with tight spacing. When the original paragraph 902 and the original paragraph 904 are included in one text, the inconsistent spacing of the two paragraphs damages the appearance and the readability of the text. The text processing server 102 can process the two original paragraphs 902 and 904 as one input text, generally as described in FIGS. 2-4, to generate a modified text including two modified paragraphs 906 and 908. For example, the text processing server 102 suggests changing "called" in original paragraph 902 to "known," changing "historically specialized" in original paragraph 902 to "history of specializing," changing "range" in original paragraph 902 to "variety." Similarly, some changes can be suggested for original paragraph 904. When all the suggested changes are accepted, the two modified paragraphs 906 and 908 have more consistent and even spacing than the two original paragraphs 902 and 904. In addition, the hyphenation in original paragraph 904 is reduced from 3 to 1 in the modified paragraph 908. The penalty reduction score for the modified text including the two modified paragraphs 906 and 908 is 51%. That is, the overall penalty for the modified paragraphs 906 and 908 is 51% less compared to the overall penalty of the original paragraphs 902 and 904.

Figure 10:
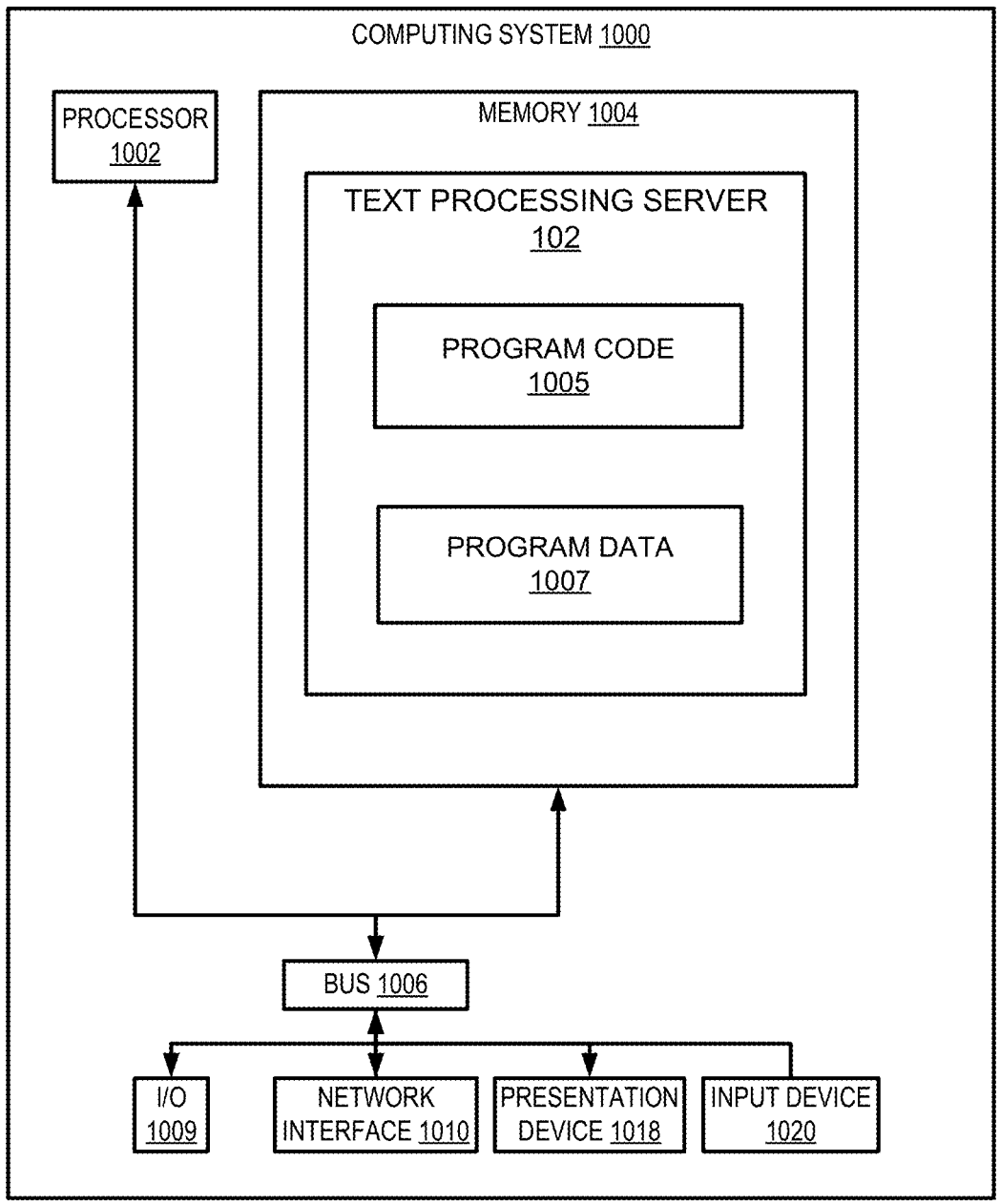
FIG. 10 depicts an example of a computing system for implementing certain embodiments of the present disclosure.

Any suitable computing system or group of computing systems can be used for performing the operations described herein. For example, FIG. 10 depicts an example of the computing system 1000 for implementing certain embodiments of the present disclosure. The implementation of computing system 1000 could be used to implement the text processing server 102. In other embodiments, a single computing system 1000 having devices similar to those depicted in FIG. 10 (e.g., a processor, a memory, etc.) combines the one or more operations depicted as separate systems in FIG. 1.

The depicted example of a computing system 1000 includes a processor 1002 communicatively coupled to one or more memory devices 1004. The processor 1002 executes computer-executable program code stored in a memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

A memory device 1004 includes any suitable non-transitory computer-readable medium for storing program code 1005, program data 1007, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 executes program code 1005 that configures the processor 1002 to perform one or more of the operations described herein. Examples of the program code 1005 include, in various embodiments, the application executed by the justification enhancement module 104 for enhancing justification of a text with minimal text editing, or other suitable applications that perform one or more operations described herein. The program code may be resident in the memory device 1004 or any suitable computer-readable medium and may be executed by the processor 1002 or any other suitable processor.

In some embodiments, one or more memory devices 1004 stores program data 1007 that includes one or more datasets and models described herein. Examples of these datasets include extracted images, feature vectors, aesthetic scores, processed object images, etc. In some embodiments, one or more of data sets, models, and functions are stored in the same memory device (e.g., one of the memory devices 1004). In additional or alternative embodiments, one or more of the programs, data sets, models, and functions described herein are stored in different memory devices 1004 accessible via a data network. One or more buses 1006 are also included in the computing system 1000. The buses 1006 communicatively couples one or more components of a respective one of the computing system 1000.

In some embodiments, the computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and/or the like. The computing system 1000 is able to communicate with one or more other computing devices (e.g., a user computing device 130) via a data network using the network interface device 1010.

The computing system 1000 may also include the number of external or internal devices, an input device 1020, a presentation device 1018, or other input or output devices. For example, the computing system 1000 is shown with one or more input/output ("I/O") interfaces 1008. An I/O interface 1008 can receive input from input devices or provide output to output devices. An input device 1020 can include any device or group of devices suitable for receiving visual, auditory, or other suitable input that controls or affects the operations of the processor 1002. Non-limiting examples of the input device 1020 include a touchscreen, a mouse, a keyboard, a microphone, a separate mobile computing device, etc. A presentation device 1018 can include any device or group of devices suitable for providing visual, auditory, or other suitable sensory output. Non-limiting examples of the presentation device 1018 include a touchscreen, a monitor, a speaker, a separate mobile computing device, etc.

Although FIG. 10 depicts the input device 1020 and the presentation device 1018 as being local to the computing device that executes the text processing server 102, other implementations are possible. For instance, in some embodiments, one or more of the input device 1020 and the presentation device 1018 can include a remote client-computing device that communicates with the computing system 1000 via the network interface device 1010 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

That which is claimed is:

1. A method performed by one or more processing devices, comprising:
 determining a penalty value for a line of a text in a digital document applied with a justification setting, wherein the penalty value indicates a level of typography violation based on the justification setting;
 determining, based on determining the penalty value for the line is greater than a threshold value, a number of characters that can be changed for the line to reduce the penalty value for the line to be equal to or less than the threshold value;

creating a map comprising penalty values for the line and corresponding numbers of characters with a nature of change to the line;

executing a natural language processing algorithm to generate a plurality of alternative phrases for an original phrase;

selecting one or more candidate phrases from the plurality of alternative phrases to replace the original phrase, wherein each of the one or more candidate phrases causes the line to change by a first number of changed characters with the nature of change indicated in the map, wherein the first number of changed characters is closer to the number of characters in the map than a second number of changed characters that an unselected alternative phrase causes the line to change;

determining one or more updated penalty values for the line with the one or more candidate phrases respectively;

selecting an alternative phrase corresponding to a lowest penalty value among the one or more updated penalty values;

modifying the line by using the alternative phrase to create a modified text; and causing the modified text to be displayed in a graphical user interface (GUI).

2. The method of claim 1, wherein the text comprises one or more paragraphs.

3. The method of claim 1, wherein the level of typography violation represents a level of violating a plurality of constraining factors, comprising word spacing, character spacing, glyph scaling, hyphenation, or format consistency.

4. The method of claim 1, wherein the natural language processing algorithm comprises a Text-To-Text Transfer Transformer (T5) algorithm.

5. The method of claim 1, wherein the nature of change comprises adding the number of characters to or removing the number of characters from the line.

6. The method of claim 1, further comprises:

determining an updated penalty value for each line of the modified text;

determining, based on determining the updated penalty value for the line is greater than the threshold value, a second number of characters that can be changed for the line to reduce the updated penalty value to be equal to or less than the threshold value;

selecting a second alternative phrase from multiple alternative phrases determined for a second original phrase in the line based on the second number of characters that can be changed for the line; and modifying the line by using the second alternative phrase to create a second modified text.

7. The method of claim 1, wherein the text comprises a plurality of lines, wherein the method further comprises:

determining an original overall penalty for the text based on penalty values for the plurality of lines of the text;

determining an updated overall penalty for the modified text based on updated penalty values for the plurality of lines of the modified text;

comparing the updated overall penalty to the original overall penalty to determine a penalty reduction score; and causing the penalty reduction score to be displayed in the GUI with the modified text.

8. The method of claim 1, wherein the modified text comprises the alternative phrase, wherein the GUI comprises a first control element when activated causing the alternative phrase to be accepted, and a second control element when activated causing the alternative phrase to be rejected.

9. A system, comprising:

a memory component;

a processing device coupled to the memory component, the processing device to perform operations comprising:

accessing a text in a digital document comprising a plurality of lines applied with a justification setting;

determining a penalty value for each line of the plurality of lines of the text, wherein the penalty value indicates a level of typography violation based on the justification setting;

determining, based on determining the penalty value for the line is greater than a threshold value, a number of characters that can be changed for the line to reduce the penalty value for the line to be equal to or less than the threshold value;

creating a map comprising penalty values for the line and corresponding numbers of characters with a nature of change to the line;

executing a natural language processing algorithm to generate a plurality of alternative phrases for an original phrase;

selecting one or more candidate phrases from the plurality of alternative phrases to replace the original phrase, wherein each of the one or more candidate phrases causes the line to change by a first number of changed characters with the nature of change indicated in the map, wherein the first number of changed characters is closer to the number of characters in the map than a second number of changed characters that an unselected alternative phrase causes the line to change;

determining one or more updated penalty values for the line with the one or more candidate phrases respectively;

selecting a first alternative phrase corresponding to a lowest penalty value among the one or more updated penalty values; and modifying the line by using the alternative phrase to create a modified text.

10. The system of claim 9, wherein the penalty value is determined based on a plurality of constraining factors comprising word spacing, character spacing, glyph scaling, hyphenation, and format consistency, and wherein the penalty value represents a level of violating the plurality of constraining factors.

11. The system of claim 9, wherein the processing device is to perform further operations comprising:

causing the modified text to be displayed in a graphical user interface (GUI), wherein the GUI comprises a first control element when activated causing the alternative phrase to be accepted, and a second control element when activated causing the alternative phrase to be rejected.

12. The system of claim 9, wherein the nature of change comprises adding the number of characters to or removing the number of characters from the line.

13. The system of claim 9, wherein the processing device is to perform further operations comprising:

determining an updated penalty value for each line of the modified text;

determining, based on determining the updated penalty value for the line is greater than the threshold value, a second number of characters that can be changed for the line to reduce the updated penalty value to be equal to or less than the threshold value;

selecting a second alternative phrase from multiple alternative phrases determined for a second original phrase in the line based on the second number of characters that can be changed for the line; and modifying the line by using the second alternative phrase to create a second modified text.

14. A non-transitory computer-readable medium, storing executable instructions, which when executed by a processing device, cause the processing device to perform operations comprising:

accessing a text in a digital document comprising a plurality of lines applied with a justification setting;

determining a penalty value for each line of the plurality of lines of the text, wherein the penalty value indicates a level of typography violation based on the justification setting;

determining, based on determining the penalty value for the line is greater than a threshold value, a number of characters that can be changed for the line to reduce the penalty value for the line to be equal to or less than the threshold value;

creating a map comprising penalty values for the line and corresponding numbers of characters with a nature of change to the line;

executing a natural language processing algorithm to generate a plurality of alternative phrases for a first original phrase;

selecting one or more candidate phrases from the plurality of alternative phrases to replace the first original phrase, wherein each of the one or more candidate phrases causes the line to change by a first number of changed characters with the nature of change indicated in the map, wherein the first number of changed characters is closer to the number of characters in the map than a second number of changed characters that an unselected alternative phrase causes the line to change;

determining one or more updated penalty values for the line with the one or more candidate phrases respectively;

selecting the alternative phrase corresponding to a lowest penalty value among the one or more updated penalty values; and modifying the line by using the alternative phrase to create a first modified text;

determining an updated penalty value for the first modified text;

selecting a second alternative phrase for a second original phrase in the first modified text based on the updated penalty value, wherein the second original phrase is identified by keeping the alternative phrase in the first modified text unchanged; and modifying the first modified text by using the second alternative phrase to create a second modified text.

15. The non-transitory computer-readable medium of claim 14, wherein the level of typography violation represents a level of violating a plurality of constraining factors, wherein the plurality of constraining factors comprises word spacing, character spacing, glyph scaling, hyphenation, and format consistency.

16. The non-transitory computer-readable medium of claim 14, wherein the nature of change comprises adding the number of characters to or removing the number of characters from the line.

17. The non-transitory computer-readable medium of claim 14, wherein the natural language processing algorithm comprises a Text-To-Text Transfer Transformer (T5) algorithm.

18. The non-transitory computer-readable medium of claim 14, wherein the executable instructions, which when executed by a processing device, cause the processing device to perform further operations comprising:

causing the second modified text to be displayed in a graphical user interface (GUI), wherein the GUI comprises a first control element when activated causing the second alternative phrase to be accepted, and a second control element when activated causing the second alternative phrase to be rejected.

* * * * *